Patented July 20, 1937

2,087,603

UNITED STATES PATENT OFFICE 2,087,603

BLENDING AGENTS FOR LUBRICATING COMPOSITIONS AND METHOD FOR MANUFACTURING SAME

Louis A. Mikeska and Charles F. Smith, Elizabeth, N. J., assignors to Standard Oil Development Company, a corporation of Delaware No Drawing. Application October 19, 1934, Serial No. 749,044

13 Claims. (Cl. 87—9)

The present invention relates to improved agents for use in lubricating oils, greases and the like and to oils and greases containing the same, and also to an improved method for producing such materials possessing a high degree of oiliness. The present invention will be fully understood from the following description.

In recent years there has been an increasing recognition of the value of oiliness in lubricants and many different substances have been suggested from time to time. The present invention deals with an efficient, cheap and effective method of producing valuable addition agents from materials characterized by little or no oiliness value on the one hand, and on the other to greatly increasing the value of materials which are originally characterized by an appreciable lubricating value.

The present method consists in subjecting certain materials, including organic aliphatic oxygen-containing substances, to a mild oxidation treatment. The materials used comprise generally acids, esters and alcohols containing at least 10 carbon atoms in a straight chain. These materials are preferably fully saturated or at least saturated to such a degree as not to show the thickening exhibited by drying or semi-drying oils when subjected to oxidation.

The materials which may be used are substances of high molecular weight, that is to say, containing from 10 to 20 carbon atoms or more, preferably in a relatively straight chain structure. Saturated aliphatic substances in a substantially pure state may be used, but naturally occurring oils, fats and mixtures thereof are cheaper and more readily available. These may be used where the iodine number is below about 70 or 60 and preferably below 20 or even lower. If the iodine number is above 70 the material should be subjected to a pretreatment such as hydrogenation to reduce the iodine number within the range disclosed. It will be understood that materials having a value up to about 60 can be used as such, but it is preferable to hydrogenate first if the iodine number even approaches that figure. Where the iodine number is below 20 there is little improvement on previous hydrogenation.

The nature of the reaction which is termed "mild oxidation" is not clearly understood but it is quite different from the ordinary "blowing" process as applied to unsaturated fatty oils. In the present instance the oxidized material is not characterized by any substantial thickening, whereas the thickening of the drying and semi-drying oils is the most outstanding characteristic of the "blowing" process. There appears to be an increase in the molecular weight during the mild oxidation process used, but this is small in comparison with that occurring during "blowing" of drying or semi-drying oils. The principal effect in the present case appears to be the oxidation of the hydrocarbon chain resulting in an increased oxygen content in the form of hydroxyl or keto groups, but this is relatively small and not easily detectable upon analysis. Furthermore, the oxidation treatment does not appreciably decrease the solubility of the materials treated whereas drying or semi-drying oils are rendered substantially insoluble in hydrocarbon solvents if the blowing process is conducted for a sufficient period.

The materials which may be used are selected from the class of acids, esters and alcohols or the like. Among the acids may be mentioned the saturated acids such as stearic or the mixed acids such as are obtained from fats, waxes and the like. Stearic acid is itself not a particularly active oiliness agent but after mild oxidation it becomes extremely powerful. Other saturated acids may be employed. The oxidized acids may be used as such or may be esterified preferably with low molecular weight alcohols such as those containing less than 10 carbon atoms, especially methyl, ethyl and the propyl and butyl alcohols, although higher molecular weight alcohols, such as cetyl alcohol, may be employed. While purely aliphatic acids are preferable to others, it has been found possible to use aliphatic acids containing substituted aromatic groups such as phenyl stearic acid and the like.

Various esters may also be employed which is intended to include not only the simple monobasic alcohol esters but also glycol and glyceryl esters. The various esters may be synthetic or they may be obtained from natural fats and waxes of low iodine number. It will be understood that if the iodine number of the particular compound is above 70 it should be reduced by hydrogenation, and as indicated before, it is preferable even to reduce the iodine number to 20 or below. Among the specific esters including glycerides which may be used, special mention should be made of cocoanut oil and palm oil. The former may be oxidized directly as also may be the latter, although it is preferable to hydrogenate palm oil. Waxes such as beeswax, Chinese wax, spermaceti, carnauba, Montan wax, Japan wax, myrtle wax and lanolin are all of low iodine number and may be used as such. More unsaturated waxes should be hydrogenated prior to oxidation as indicated before. Of the glycerides animal and vegetable tallow may be oxidized directly without hydrogenation but those of the higher iodine number, such as lard, cottonseed stearine, rapeseed oil, whale oil and the like should be prehydrogenated.

Alcohols of the type containing 10 carbon atoms or more in a relatively straight chain may also be used and their oiliness properties are greatly improved by mild oxidation. Pure substances or mixtures such as are obtained from the higher alcohols present in natural waxes may be used. The oxidized alcohols may be added to the oil directly and used as such or they may be reacted, preferably with low molecular weight acids, so as to produce esters. Acetic acid is preferred because of its cheapness and availability but other organic acids containing less than 10 carbon atoms may be used as well.

The oxidation treatment is accomplished preferably with air or other gases rich in oxygen at relatively low temperatures, for example, below 200° C., and normally in the range from 100 to 180° C. The reaction may be accomplished in the absence of all catalytic materials but it is improved if catalysts are used, such as the manganese and cobalt salts of the fatty and other acids. Preoxidized fat or oil may also be used as the catalyst. The oxidation is generally carried out for several hours, for example 5 to 20 hours has been found to be satisfactory with materials of quite different types. It is usual that the acidity increases, especially where neutral esters are oxidized, but the amount is ordinarily small and increases the acid number by at least 5 to 10 points and preferably up to 15 or 80 points (mg. of KOH/gram). The saponification number also increases with such treatment, usually by about three times as much as the acid which is increased, that is to say by at least 15 points and preferably from 30 to 90 points. In many instances the free acid is not objectionable but in the case of certain bearing combinations it causes corrosion and it is usually considered best to esterify the free acid with low molecular weight alcohols. In spite of the very limited development of acidity the increase in the oiliness or lubricity of the compound is very great. The oxidation is conducted preferably in a vessel with a glass or enamel lining or in an aluminum vessel. The substance is preferably maintained in a liquid condition and the air or other oxidizing gas is blown through the liquid. The gas should be finely divided and in excess so as not to char and to leave oxygen in the off gases.

The improved oiliness agents are readily soluble in petroleum oils and when added to the oil greatly increases its lubricating quality. The amount used will vary somewhat according to the type of oil employed and the service encountered but ordinarily the proportion should be from ½ to 2½%, and ordinarily makes no change in the ordinary properties of the oil, such as color, flash and viscosity.

The following examples will illustrate the method of carrying out the present invention and the results obtained thereby.

Example I

Cocoanut oil was added to a hydrocarbon lubricating oil in proportion of about 2% by weight and the blend was tested on the Mougey machine described in the National Petroleum News of November 11, 1931, page 47, with steel to aluminum bearing combination. The blend carried only 23 weights in the test, and the frictional values were above 100.

A sample of cocoanut oil was then mildly oxidized at 330° F. by blowing air through the oil for 16 hours. The product was light in color and not perceptibly more viscous than the original oil. When added in proportion of 2% to the same hydrocarbon lubricating oil previously used, it greatly increased the lubricating quality so that it was not only able to carry the full 25 weights, but the final frictional value was only 13.5. The friction curve was smooth and the bearing ran noticeably cooler than before.

Example II

The following tests show the effect of mild oxidation treatment on the load carrying and frictional properties of beeswax, which represent a natural low iodine number wax. The oil was an S. A. E. 20 lubricating oil and the agents were added in 2% concentration. The oxidized wax sample was prepared by blowing air through the melted wax for 16 hours at 180° C. The inspections of the beeswax sample and the mildly oxidized sample are given for convenience:

|  | Acid No. | Sap. No. | Iodine No. |
|---|---|---|---|
| Beeswax | 18.9 | 94 | 10.37 |
| Oxidized wax | 28.0 | 176 |  |

The oils containing the above products were tested on the Mougey machine. The sample containing beeswax failed at 23 weights while the sample containing the oxidized wax carried the full 25 weights at a final frictional value of 20.

Example III

Tests similar to those in the prior examples were prepared on a 2% blend of menhaden oil and 2% of a hydrogenated, oxidized menhaden oil in the S. A. E. 20 oil. The menhaden oil and the hydrogenated and oxidized products had the following characteristics:

|  | Acid No. | Sap. No. | Iodine No. |
|---|---|---|---|
| Menhaden oil | 8.0 | 195 | 149.6 |
| Hydrogenated menhaden oil | 2.4 | 194 | 1.6 |
| Oxidized hydrogenated menhaden oil | 60.9 | 280.8 | 3.9 |

The samples gave the following results on the Mougey test machine:

| Sample | Weight carried | Final friction |
|---|---|---|
| Menhaden oil | 25 | 20 |
| Hydrogenated menhaden oil | 19 | Failed |
| Hydrogenated oxidized menhaden oil | 25 | 19 |

While the sample containing menhaden oil gave good load carrying and frictional characteristics, it was quite unsuitable and on oxidation forms gums and tarry products which would be very objectionable. Hydrogenation of the menhaden oil seriously affects the lubricating properties but by mild oxidation these are restored and a stable product is obtained.

These oxidized products may be added to crude oils and their fractions or residuals, either in the natural state or partially or highly refined by chemicals, solvents, hydrogenation, and the like, flushing oils, voltolized oils, greases, synthetic oils, fuels, solvents, and the like. In many cases they may be added to fatty oils, ester lubricants, and similar oxygen containing materials.

They may be used in conjunction with any or all of blending materials, such as sludge dispersers, bright stocks and other residuals, pour inhibitors, metallo-organic compounds, soaps, polymers, dyes, oil soluble resins, extreme pressure lubricating agents, oxidation inhibitors, colloidal materials, and the like.

The present invention is not to be limited by any theory of the action of the oiliness agents nor to any particular raw material used for their production, nor, in fact, to any particular method of oxidation but only to the following claims in which it is desired to claim all novelty inherent in the invention.

We claim:

1. An improved lubricating oil comprising a mineral lubricating oil and a small quantity of an organic addition agent selected from the class of esters and alcohols characterized by an iodine number below 60, and at least 10 carbon atoms in a straight chain, and which has been mildly oxidized by blowing with a gas rich in free oxygen at a moderate temperature for a prolonged period.

2. Process according to claim 1 in which the organic addition agent is a mildly oxidized ester.

3. Process according to claim 1 in which the organic addition agent is a mildly oxidized glyceride.

4. Process according to claim 1 in which the organic addition agent is a mildly oxidized cocoanut oil.

5. Process according to claim 1 in which the organic addition agent is a mildly oxidized alcohol.

6. An improved process for producing valuable addition agents for lubricating oils comprising mildly oxidizing an organic compound selected from the class of esters and alcohols which are characterized by a low iodine number and containing at least 10 carbon atoms in a straight chain.

7. Process according to claim 6 in which the oxidation is accomplished by blowing with air at a temperature between about 100 and 180° C.

8. An improved process for producing valuable addition agents for lubricating oils comprising hydrogenating an organic compound selected from the class of esters and alcohols, containing about 10 carbon atoms so as to substantially reduce its iodine number and then mildly oxidizing such hydrogenated product.

9. Process according to claim 6 in which the iodine number of the raw material is reduced below 20 before oxidation.

10. An improved lubricating oil comprising a mineral lubricating oil and a small quantity of an oiliness agent prepared by subjecting an organic ester having at least 10 carbon atoms in a straight chain and an iodine number below 60 to a mild oxidation.

11. An improved lubricating oil comprising a mineral lubricating oil and a small quantity of an oiliness agent prepared by subjecting an organic ester having at least 10 carbon atoms in a straight chain and an iodine number below 20 to a mild oxidation.

12. An improved lubricating oil comprising a mineral lubricating oil and a small quantity of an oiliness agent prepared by subjecting a glyceride having at least 10 carbon atoms in a straight chain and an iodine number below 20 to a mild oxidation.

13. An improved lubricating oil comprising a mineral lubricating oil and a small quantity of an oiliness agent prepared by subjecting cocoanut oil to a mild oxidation.

LOUIS A. MIKESKA.
CHARLES F. SMITH.